United States Patent
Malsbary et al.

(10) Patent No.: US 9,501,259 B2
(45) Date of Patent: Nov. 22, 2016

(54) AUDIO OUTPUT DEVICE TO DYNAMICALLY GENERATE AUDIO PORTS FOR CONNECTING TO SOURCE DEVICES

(71) Applicant: QUALCOMM Incorporated, San Diego, CA (US)

(72) Inventors: Todd Malsbary, Seattle, WA (US); Michael Larson, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/550,865

(22) Filed: Nov. 21, 2014

(65) Prior Publication Data

US 2015/0146881 A1    May 28, 2015

Related U.S. Application Data

(60) Provisional application No. 61/907,982, filed on Nov. 22, 2013, provisional application No. 61/907,988, filed on Nov. 22, 2013.

(51) Int. Cl.

| | |
|---|---|
| *G06F 3/16* | (2006.01) |
| *H04R 27/00* | (2006.01) |
| *H04R 3/12* | (2006.01) |
| *H04L 29/08* | (2006.01) |
| *H04W 76/02* | (2009.01) |
| *H04H 20/61* | (2008.01) |
| *H04H 60/04* | (2008.01) |

(52) U.S. Cl.
CPC ............. *G06F 3/165* (2013.01); *G06F 3/162* (2013.01); *H04H 20/61* (2013.01); *H04H 60/04* (2013.01); *H04L 67/104* (2013.01); *H04R 3/12* (2013.01); *H04R 27/00* (2013.01); *H04W 76/025* (2013.01); *H04R 2227/003* (2013.01); *H04R 2227/005* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 6,311,161 B1 | 10/2001 | Anderson et al. | |
| 7,272,232 B1 | 9/2007 | Donaldson et al. | |
| 7,369,532 B2 * | 5/2008 | Silvester ............. | H04W 76/025 370/349 |
| 7,561,932 B1 | 7/2009 | Holmes et al. | |
| 8,107,614 B2 | 1/2012 | Sobti et al. | |
| 8,218,792 B2 | 7/2012 | Morey | |
| 8,644,481 B2 | 2/2014 | Bear et al. | |
| 8,645,559 B2 | 2/2014 | Holk et al. | |
| 8,694,140 B2 | 4/2014 | Batson et al. | |
| 2003/0133582 A1 * | 7/2003 | Niederdrank .......... | H04R 25/43 381/315 |
| 2004/0266404 A1 * | 12/2004 | Nasu ................... | H04M 1/6066 455/414.1 |
| 2007/0004472 A1 * | 1/2007 | Gitzinger ............ | H04M 1/6066 455/575.2 |

(Continued)

FOREIGN PATENT DOCUMENTS

WO    WO-2013167884 A1    11/2013

*Primary Examiner* — Paul Huber
(74) *Attorney, Agent, or Firm* — Paradice and Li LLP

(57) ABSTRACT

An audio output device that operates on a network to connect with a first source device. The connection to the first source device can be made using a first wireless port, so that the first source device streams a first audio content to the first wireless port of the audio output device. When connected to the first source device, the audio output device generates an advertisement for the network, which communicates that the audio output device is available to receive a connection to another source device. In this way, the audio output device generates a new wireless port to connect to a second source device when the connection with the first source device is active.

30 Claims, 4 Drawing Sheets

(56) References Cited

U.S. PATENT DOCUMENTS

| | | | |
|---|---|---|---|
| 2007/0206829 A1* | 9/2007 | Weinans | H04M 1/6066 381/370 |
| 2013/0242805 A1* | 9/2013 | Jung | H04W 4/08 370/255 |
| 2013/0322648 A1 | 12/2013 | Chukka et al. | |
| 2015/0148928 A1 | 5/2015 | Malsbary | |

* cited by examiner

AUDIO OUTPUT DEVICE TO DYNAMICALLY GENERATE AUDIO PORTS FOR CONNECTING TO SOURCE DEVICES

RELATED APPLICATIONS

This application is a non-provisional filing that claims the benefit of U.S. Provisional Patent Application No. 61/907,982 filed Nov. 22, 2013 entitled "Audio Output Device to Concurrently Output Multiple Audio Streams from Different Source Devices", and U.S. Provisional Patent Application No. 61/907,988 filed Nov. 22, 2013 entitled "Audio Output Device that Utilizes Policies to Concurrently Handle Multiple Audio Streams from Different Sources", both of which applications are fully incorporated herein by reference.

BACKGROUND

Conventional network-connected speakers receive wireless audio streams from other devices on a network. Typically, such speakers accept an audio stream from only one source device at a time. Under conventional approaches, if a second audio stream is sent to a speaker over a local wireless connection, the speaker fails, or stops receiving the first audio stream in order to receive the second audio stream.

DETAILED DESCRIPTION

Figure 1:
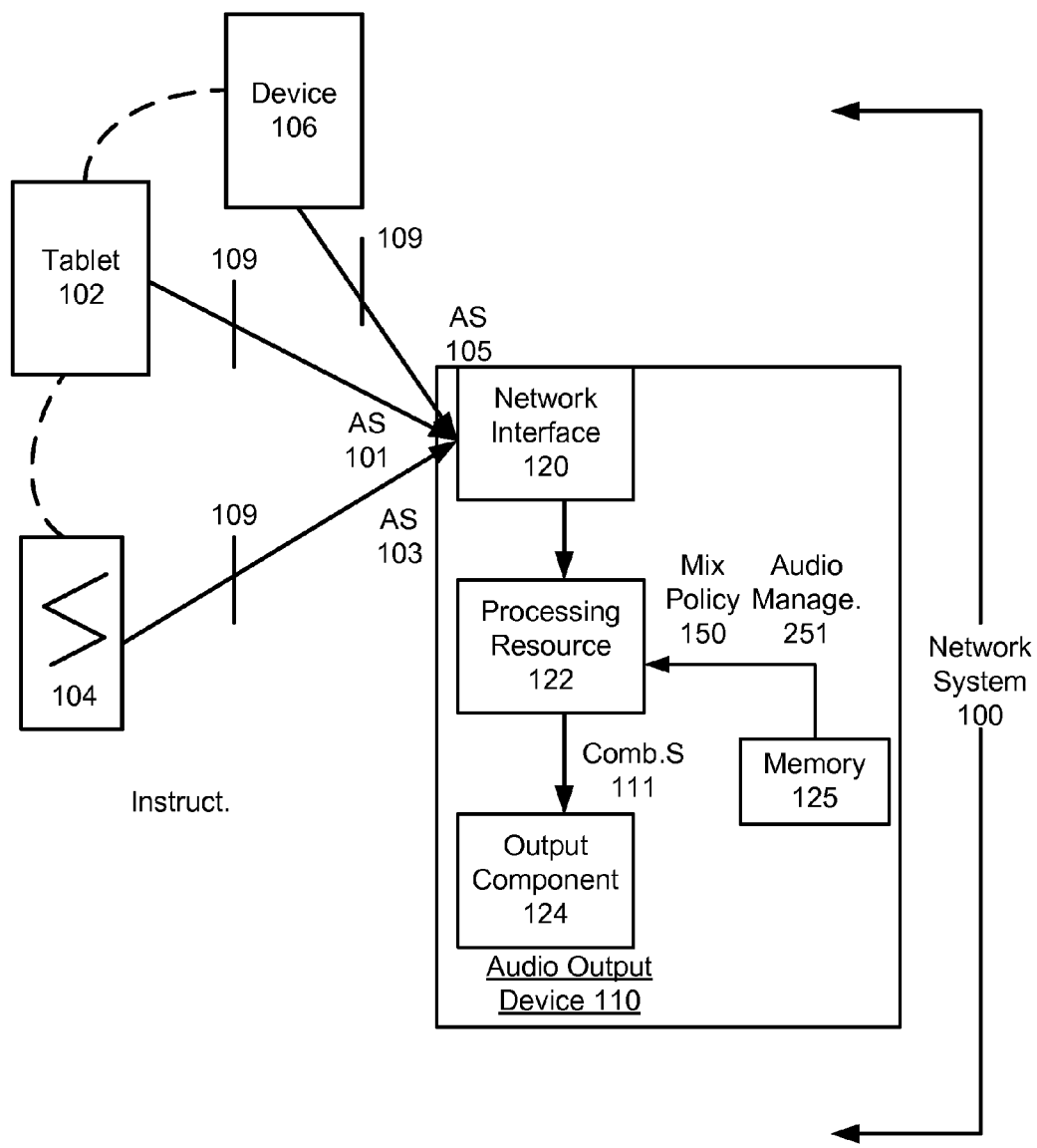
FIG. 1 illustrates an example network system in which an audio output device can receive multiple audio streams from different devices concurrently over a network.

Embodiments described herein include an audio output device that is capable of concurrently handling multiple audio streams transmitted from different source devices. According to some embodiments, the audio output device outputs or otherwise acts on the incoming audio streams based on a policy that is determined by factors such as the audio types of one or more of the incoming audio streams.

According to an embodiment, an audio output device includes a wireless network interface, an audio output component, and a processing resource. The processing resource uses the wireless network interface in providing multiple ports for receiving audio streams from multiple devices. The processing resource receives a first audio stream from a first device using a first port, and determines an audio type of the first audio stream. The processing resource outputs at least a portion of the first audio stream using the audio output component. In response to receiving a second audio stream from a second device using a second port, the processing resource determines an audio type of the second audio stream. The processing resource determines a policy for outputting the first and second audio streams based on the audio type of each of the first audio stream and the second audio stream. The processing resource outputs least one of the first audio stream or the second audio stream based on the determined policy.

In one embodiment, the processing resources determine the audio type of each of the first audio stream and the second audio stream as being one of at least music, voice, or an alert.

Additionally, in some variations, the processing resource is able to use the multiple ports to receive audio from multiple devices that are connected to a same local network.

Still further, the processing resource provides the first port and the second port for a wireless peer-to-peer connection with each of the first device and the second device.

In some variations, the network interface is connected to a local network, and the processing resource operates to discover multiple other devices that are connected to the local network.

Still further, the processing resource may broadcast to the multiple other devices that the audio output device is capable of providing multiple ports for receiving multiple audio streams from different devices.

In some embodiments, the processing resources mixes the first audio stream and the second audio stream based on the determined policy.

Still further, in some embodiments, the processing resource mutes or lowers a volume of one of the audio streams in order to output the other audio stream, based on the determined policy.

Additionally, in some embodiments, the processing resource communicates, based on the determined policy, a command to one of the first device or the second device to affect a manner in which the first device or second device provide the respective first or second audio stream.

Still further, in some embodiments, the processing resource forwards at least one of the first audio stream or the second audio stream to another device, based on the determined policy.

Still further, according to another embodiment, an audio output device includes a wireless network interface, an audio output component, and a processing resource. The processing resource uses the wireless network interface in providing a first port to receive a first audio stream from a first device over a network. In response to receiving the first audio stream, at least a portion of the first audio stream is outputted using the audio output component. While first audio stream is being received, the processing resource uses the wireless network interface to provide a second port. The second port receives a second audio stream from a second device over the network. Each of the first audio stream and the second audio stream are outputted by the output component.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Network System

FIG. 1 illustrates an example network system in which an audio output device can receive multiple audio streams from different devices concurrently over a network. In an example of FIG. 1, a network system 100 includes an audio output device 110 that has network connectivity with a heterogeneous set of devices. In the example provided, a first source device 102 (e.g., a tablet our mobile handset), a second source device 104 (e.g., notification device, such as a network connected doorbell), and a third source device 106 (e.g., network connected intercom or microphone) can each connect to the audio output device 110. Each of the source devices 102, 104, 106 can signal audio streams 101, 103, 105 of different types concurrently to the audio output device 110. The audio output device 110 can concurrently output both of the first and second audio streams 101, 103 using a policy based approach. In particular, the audio output device 110 can implement one or more policies to output multiple audio streams concurrently based on aspects that include audio type of individual audio streams. By way of example, the audio output device 110 can implement a policy-based approach to selectively (i) mix one or more concurrently received audio streams, or (ii) mute or reducing the volume of one audio stream in favor of the other audio stream.

The audio output device 110 can determine the type of each audio stream 101, 103, 105 based on a type of the corresponding source device. In a variation, the audio output device 110 can determine a type of the audio stream 101, 103, 105 by analyzing a segment of the respective incoming audio stream.

In more detail, the audio output device 110 includes a network interface 120, a processing resource 122, an output component 124 and a memory 125. The network interface 120 can connect with the other devices using a wireless communication protocol such as provided under standards labeled as Bluetooth, Wireless Fidelity (e.g., 802.11(a), 802.11(b), 802.11(g), 802.11 (n) or "Wi-Fi"), or wireless Universal Serial Bus (wireless "USB"). For example, the audio output device 110 can operate as a connected device on a home network, and connect to other devices in the home network using a Wi-Fi connection.

In variations, multiple network interfaces 120 can be employed to connect with devices using different communication mediums (e.g., Wi-Fi and Bluetooth). Still further, in some variations, the audio output device 110 can utilize a wired network connection, such as an Ethernet type connection. Furthermore, in some variations, one or more of the source devices 102, 104, 106 can be located remote to the audio output device 110. For example, one or more of the source devices 102, 104, 106 can be connected to the audio output device 110 over the Internet.

In some embodiments, the processing resource 122 can implement instructions for enabling the audio output device 110 to establish peer-to-peer connections 109 with the other connected source devices 102, 104, 106. The peer-to-peer connections 109 can be established over, for example, a Wi-Fi network. The devices that are connected to one another over one of the peer-to-peer connections 109 are connected directly, without use of an intermediate computer such as a server. In some implementations, the processing resource 122 can implement software services and an application framework for enabling peer-to-peer connectivity in a local network. Additionally, each of the source devices 102, 104, 106 can employ similar software services and application frameworks for enabling peer-to-peer connectivity with the audio output device 110. The source devices 102, 104, 106 can also establish and use peer-to-peer connections with each other using the shared software services and application framework. An example of software services and application framework for enabling peer-to-peer connectivity includes software provided under the trade name ALLJOYN (an open source project provided by ALLSEENALLIANCE.ORG.).

In an example of FIG. 1, the output component 124 can correspond to a speaker component. For example, in one implementation, the audio output device 110 corresponds to a wireless speaker connected in the home network environment, and the output component 124 can correspond to a combination of a magnet, coil and diaphragm. In the home networking environment, other devices may connect and establish connections (e.g., peer-to-peer type connection) with each other and with the audio output device 110.

In operation, the audio output device 110 can, at a given instance, establish peer-to-peer connections 109 with, for example, one of the source devices 102 (e.g., tablet) in order to receive a corresponding audio stream 101. The audio stream 101 can be received by the network interface 120, and signaled by the processing resource 122 through the output component 124. The connection and receipt of the audio stream 101 can be at the direction of an end user, who can, for example, operate the transmitting source device 104. Alternatively, the user can operate a remote control device in the network system 100 to command the source device 102 to signal the audio stream 101.

According to embodiment, while the audio stream from the source device 102 is received, another audio stream can be received from another one of the source devices 104. The network interface 120 can receive the second audio stream 103 over a peer-to-peer connection 109 that is established with the source device 104. The additional audio stream 103 can be received by the network interface 120 and processed by the processing resource 122. In particular, the processing resource 122 can receive and process the audio stream 103 while receiving and processing the first audio stream 101 from the first source device 102.

The memory 125 can store instructions and data for implementing an audio management system ("audio management instructions 251"), as well as data for mix policies 150. The audio management instructions can be executed by the processing resource 122 in order to implement an audio management system such as described with an example of FIG. 2.

In some embodiments, the processing resource 122 and memory 125 maintain a set of mix policies 150 that dictate how the individual audio streams 101, 103 should be combined or mixed when received over a given duration of time. In one embodiment, the mix policies 150 are based at least in part on an audio type of the respective audio streams 101, 103. According to some embodiments, the type of audio stream can correspond to one of music, voice, or notification (or alert). For example, in FIG. 1, the first device 102 (tablet) can transmit music, the second device 104 (doorbell) can transmit a notification, and the third device 106 (mobile handset) can transmit voice. Still further, in some embodiments, the type of audio stream can be used to select the mix policy 150, so as to dictate the combined stream and its playback characteristics when outputted by the output component 124.

In operation, the processing resource 122 can generate a combination stream 111 for the output component 124 that is based on one or more of the mix policies 150. In one implementation, the combination stream 111 can correspond to a mixture of the first audio stream 101 and the second audio stream 103, so that the output component 124 generates audio corresponding to both streams at the same time.

The processing resource 122 can use the mix policies 150 to determine the form of the combined stream 111. For example, in another implementation, the combination stream 111 can correspond to one of the two audio streams being muted or raised in volume relative to the other audio stream. Among other aspects, the selected mix policy 150 can determine the relative volume or other audio characteristic of one audio stream relative to another, while both audio streams can be played back at the same time. More specifically, in some embodiments, the selected mix policy 150 can specify, based on the respective audio type of each audio stream, one or more of (i) a volume of each audio stream relative to another audio stream, (ii) a duration during which a particular audio stream is to be heard or played at a given volume, (iii) one audio stream fading relative to another, and/or (iv) an audio affect to one or both streams (e.g., a gradual fade of one audio stream, an adjustment to the pitch of another audio stream etc.).

Still further, the processing resource 122 can implement the mix policy 150 in a manner that toggles or stitches the respective audio streams. For example, the processing resource 122 can implement a mix policy 150 by segmenting or adjoining the audio streams 101, 103. More specifically, the processing resource 122 can pause one audio stream for another, then playing the audio stream 103 that was paused, and then repeating the pattern. Numerous other variations can be implemented in regards to the manner in which the combination stream 111 utilizes each of the audio streams 101, 103, and by which both audio streams can be heard at one time by the user.

Still further, one more additional audio streams 105 can be received from other source devices 106 using, for example, peer-to-peer connections made in the given network environment. Thus, for example, the audio output device 110 can receive one or more additional audio streams from other devices that connect to the audio output device 110 over the local network. Additionally, in some implementations, the additional source devices may also use peer-to-peer connections 109 in order to signal additional audio streams to the audio output device 110. The processing resource 122 can utilize mix policies 150 to form the combination stream 111 with three or more audio streams, in similar fashion to that described with two audio streams. For example, the multiple audio streams can be combined into the combination stream 111. Alternatively, one or more of the audio streams can be muted or raised in volume relative to other audio streams in the combination stream 111. The mix policies 150 can include policies that account for the number of audio streams that are received at one time. Thus, for example, the mix policies 150 can account for audio type and/or the number of audio streams that are being received at one time.

In some variations, the audio output device 110 has the ability to command or utilize other devices on the same local network, including, for example, the source devices 102, 104, 106. As described with some examples, the audio output device 110 and the source devices 102, 104, 106 can be implemented to have a common platform (e.g., common application framework and core services). Among other functionality provided with the shared platform, the audio output device 110 can communicate with the source devices 102, 104, 106 using peer-to-peer connections. Additionally, the audio output device 110 can include a command set or library that can be integrated with the mix policies 150 in order to command, for example, the source devices or other devices that share the same platform to perform certain functions. In particular, the audio output device 110 can utilize the shared platform to communicate commands to one or more of the source devices 102, 104, 106, such as commands to pause or stop playback as dictated by a selected mix policy 150. Thus, rather than mute output of one audio stream (where music for example, continues to play but the user cannot hear it), the audio output device 110 can pause the source of the music so that the user does not miss a portion of a song.

The other devices that share the platform can also announce their capabilities to one another using services of the shared platform. The audio output device 110 can use the device announcements to determine what devices on the local network can handle, for example, a re-stream of an audio stream from the audio output device 110. In one embodiment, the mix policy 150 may provide for one of multiple audio streams being received by the audio output device 110 to be re-streamed to another device (e.g., device selected by user or by default setting). For example, if the first device 102 (e.g., tablet) provides a first audio stream corresponding to music, and the second device 104 (e.g., doorbell) provides a notification, the audio output device 110 may implement a policy that provides for the second stream to be re-transmitted to a predetermined device (e.g., mobile handset or third device 106).

Logical Architecture

Figure 2:
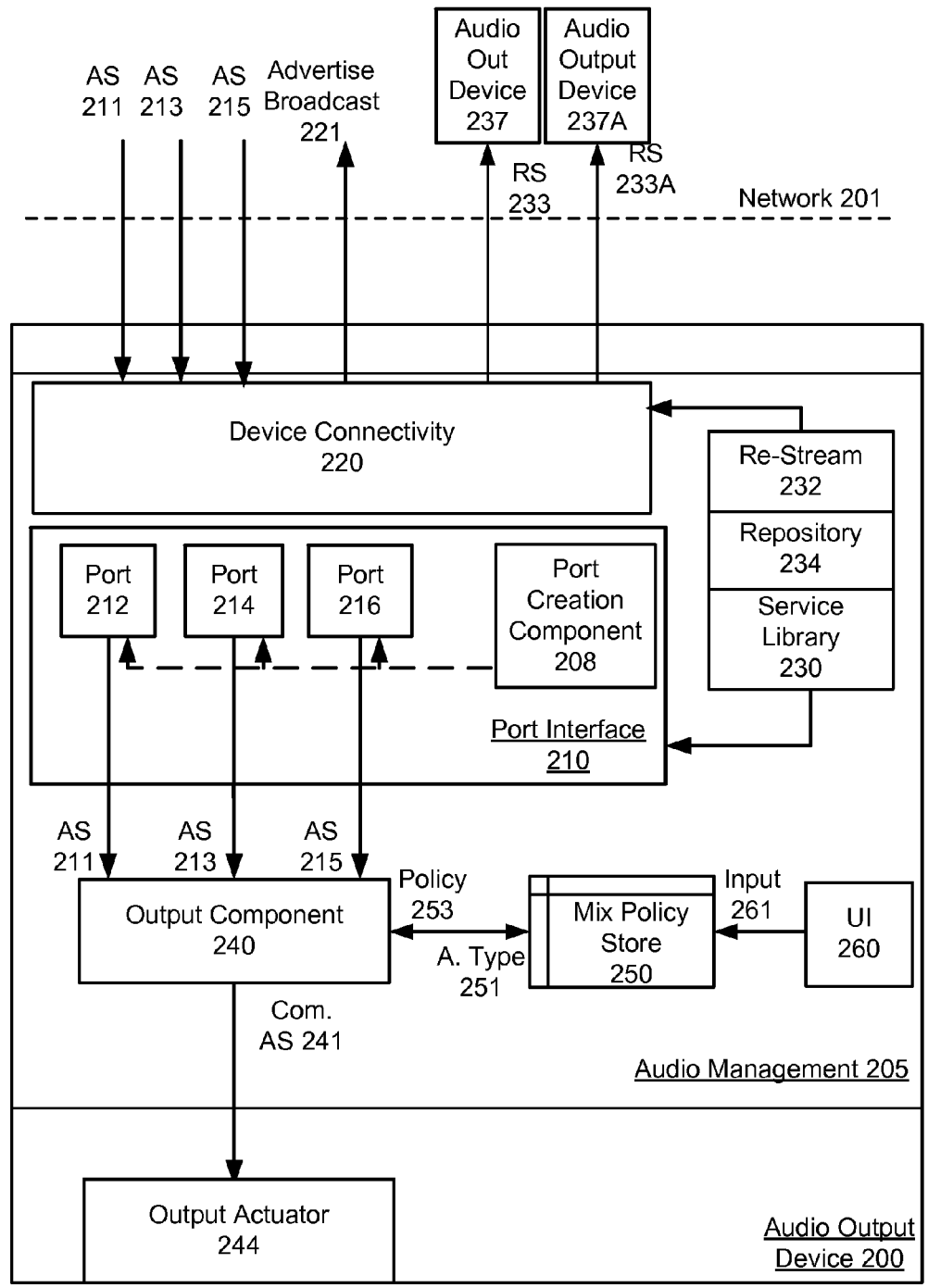
FIG. 2 illustrates an example of a logical architecture for an audio output device, according to one of more embodiments.

FIG. 2 illustrates an example of a logical architecture for an audio output device, according to one of more embodiments. An audio output device 200 such as shown by an example of FIG. 2 can be representative of the audio output device 110 shown with an example of FIG. 1. With reference to FIG. 2, the audio output device 200 includes an audio management system 205, which can include logical components that include a port interface 210, a device connectivity component 220, a service library 230, and an output component 240. The service library 230 can include a software framework and a set of services that enable the device to communicate with other connected devices. Among the functionality provided, the service library 230 can include instructions and processes for implementing the port interface 210 and the device connectivity component 220. With reference to FIG. 1, the logical components of the audio output device can be implemented by the processing resource 120, which executes instructions from memory resources in order to provide the logical components and associated functionality.

Likewise, with further reference to FIG. 1, the source devices 102, 104 and 106 that utilize the audio output device 200 can also include a version of the service library 230. In this regard, the source devices 102, 104, 106 and the audio output device 200 can share a common platform on a local area network that enables interoperability and connectivity with other devices on the local network (e.g., home network). In this way, the audio output device 200 can establish an interoperable network environment with the source devices 102, 104, 106 to enable, for example, peer-to-peer connectivity and other network functionality.

In more detail, the device connectivity component 220 can implement processes for establishing network connections with other devices that share the local network environment. In one implementation, the device connectivity component 220 can implement processes for enabling or establishing peer-to-peer connections with other devices. With reference to FIG. 1, for example, the source devices 102, 104, and 106 can include variations of the device connectivity component 220 in order to establish the peer-to-peer connections with both the audio output device 200 and with each other. In one variation, the peer-to-peer connections can be made using, for example, a Wi-Fi connection. In variations, the peer-to-peer connections can be made using Bluetooth connectivity, or through other wireless communication mediums such as wireless USB.

The port interface 210 implements processes to provide multiple audio ports 212, 214, 216. Each audio port 212, 214, 216 can receive audio input via the network interface 120 (see FIG. 1) from another device over the local network. In one embodiment, each port 212, 214, 216 can receive an audio stream over the local network from another source device using a peer-to-peer connection.

In one embodiment, the port interface 210 is static so that the number of ports 212, 214, 216 that are provided does not change. When the port interface 210 is static, the port interface can handle multiple incoming audio streams from different devices, so long as there is an available port.

In another embodiment, the port interface 210 is dynamic. In such a variation, the port interface 210 can dynamically create ports for receiving audio streams as needed. In one implementation the port interface 210 includes a port creation component 208 which dynamically creates and terminates ports 212, 214, 216, depending on the number of audio streams that are being received. In one implementation, the port creation component 208 includes functionality that is triggered by connectivity activity provided through the device connectivity component 220. When, for example, the device connectivity component 220 receives an audio stream or connection request from another one of the source devices 102, 104, 106 (see FIG. 1), the device connectivity component 220 can signal the port interface 210 of the need for an additional port. In response, the port creation component 208 can generate an additional port 214, 216 for handling the incoming audio stream. Likewise, when an existing port 212, 214, 216 is no longer in use, the port creation component 208 can terminate the port.

In order to communicate the availability of multiple audio ports, the device connectivity component 220 can signal an advertisement broadcast 221 to other devices that share the local network, or which alternatively share peer-to-peer connections on the local network. The advertisement broadcast 221 can identify the capability of the audio output device 200 to provide multiple ports. In variations in which the port interface 210 is static, either the number of ports or the number of available ports can be signaled by the advertisement broadcast 221. In variations in which the port interface 210 is dynamic, the capability of the port interface to establish additional ports is communicated in the advertisement broadcast 221.

With reference to FIG. 1, for example, the advertisement broadcast 221 can be received by other source devices 102, 104, 106 that share the local network. In variations, the advertisement broadcast 221 can be received by the source devices 102, 104, 106 that are connected to the audio output device 200 by way of a peer-to-peer connection over the local network. When the source devices 102, 104, 106 share a common software platform such as provided by the service library 230, the source devices can respond by signaling audio streams to the audio output device 200 as needed or as desired.

With further reference to FIG. 2, the output component 240 can maintain a mix policy store 250 that dictates how individual audio streams are to be combined and outputted. The output component 240 can select a policy 253 for how one or more of multiple audio streams are to be outputted relative to another of the received audio streams. The selection of the policy 253 can be based in part on an audio type 251 of one or more of the audio streams. For example, the policy 253 can be determined based in part on whether the incoming audio streams are of a music, voice or notification type.

In one embodiment, the output component 240, for example, can determine the audio type 251 of one or more of the incoming audio streams by identifying a type of the corresponding source device. For example, each source device 102, 104, 106 (see FIG. 1) can transmit an identifier or device type from which the audio type can be determined. The output component 240, for example, can determine the audio type 251 of one or more of the incoming audio streams by analyzing a portion of the individual incoming audio streams.

In this manner, the selected policy 253 can be based on a variety of factors, including the respective audio type 251 of each incoming audio stream, the number of audio streams, or other facets (e.g., preferences of the user). Based on the selected policy 253, the output component 240 can (i) output a single audio stream when one audio stream is received from a source device through the port interface 210, and (ii) output a combined audio stream 241 when two or more audio streams are received from different source devices via different audio ports 212, 214 of the port interface 210. For example, in operation, the device connectivity component 220 can receive multiple audio streams 211, 213, 215 concurrently from different devices that are connected via peer-to-peer connections. The multiple audio streams 211, 213, 215 can be combined by the output component 240 in a manner that is dictated by one or more policies of the mix policy store 250.

The combined audio stream 241 can have different forms, depending on the selected policy 253 (or set of policies) that are being implemented. In one embodiment, the output component 240 can provide different instances of playback logic for each audio stream 211. The selected policy 253 can designate, for example, a relative volume settings for each playback instance based on, for example, a predetermined rule or configuration (e.g., always mute the first playback instance, etc.). In this way, multiple audio streams 211, 213, 215 can be outputted at the same time. In variations, the output component 240 can, based on the selected policy 253, mute or lower the volume of one instance of the playback logic relative to another instance, in order to lower the volume of one audio stream relative to the other audio stream. In similar fashion, one audio stream can be raised in volume relative to the other audio stream(s). By way of example, the first audio stream can correspond to a transmission of a musical stream, and the second audio stream can correspond to a transmission of an alert from a network-connected doorbell. Both audio streams can be muted when played back at one time, with the doorbell being played back at a higher level (e.g., 90%) and the music being played back at a lower level (e.g., 10%). When the audio stream from the doorbell ends, the playback of the music can again be raised to 100%.

In other variations still, the audio streams 211, 213 and 215 can be stitched, and/or segmented so that one audio stream starts and stops, followed by another audio stream, and the pattern can be repeated over a duration during which the two or more audio streams are received. For example, the output component 240 can include audio segmentation logic which stitches or interleaves each audio stream into a single combined stream that includes components from each audio stream provided in sequence or series.

Variations to the volume setting of a given policy can be made based on user input. For example, a user preference or input can adjust the volume setting when the audio type corresponds to a notification (e.g., doorbell) or voice input (e.g., speaker phone). Accordingly, with reference to FIG. 2, one embodiment provides that the audio output device 200 includes a user interface 260 for receiving input 261 that affect individual policies maintained by the mix policy store 250. The user input 261 can designate specific policies based on, for example, audio type. The user input 261 can specify, for example, volume settings, duration, and the manner in which the audio stream from a particular device is to be combined (e.g., toggle audio streams, fade one stream over another, play multiple audio streams equally, etc.).

In some embodiments, the service library 230 can include services corresponding to a command interface. The command interface can provide for the audio output device 200 to signal one or more commands to other devices. For example, as described with an example of FIG. 4, the audio output device 200 can signal one of the source devices a command when receiving multiple streams (e.g., a command to pause or stop).

The audio stream 241 can be communicated to an output actuator or other physical interface for a speaker (e.g., output component 124). In this way, the audio output device 200 can output audio while implementing processes such as described.

As an addition or variation, the service library 230 can also include a device repository 234. The device repository 234 can identify each device on the local network, and further identify a status and/or capability of each device. Additionally, some embodiments may provide for the service library 230 to include a re-streamer 232. The re-streamer 232 can enable the audio output device 200 to re-stream one or more audio streams ("re-streams 233") to other devices 237 located on the network 201. The location, state and capability of the other devices 237 to receive the stream can be maintained with the repository. As further described with an example of FIG. 4, the audio output device 200 can re-stream 233A one of the audio streams to a third device based 237A on a policy determination.

Methodology

Figure 3:
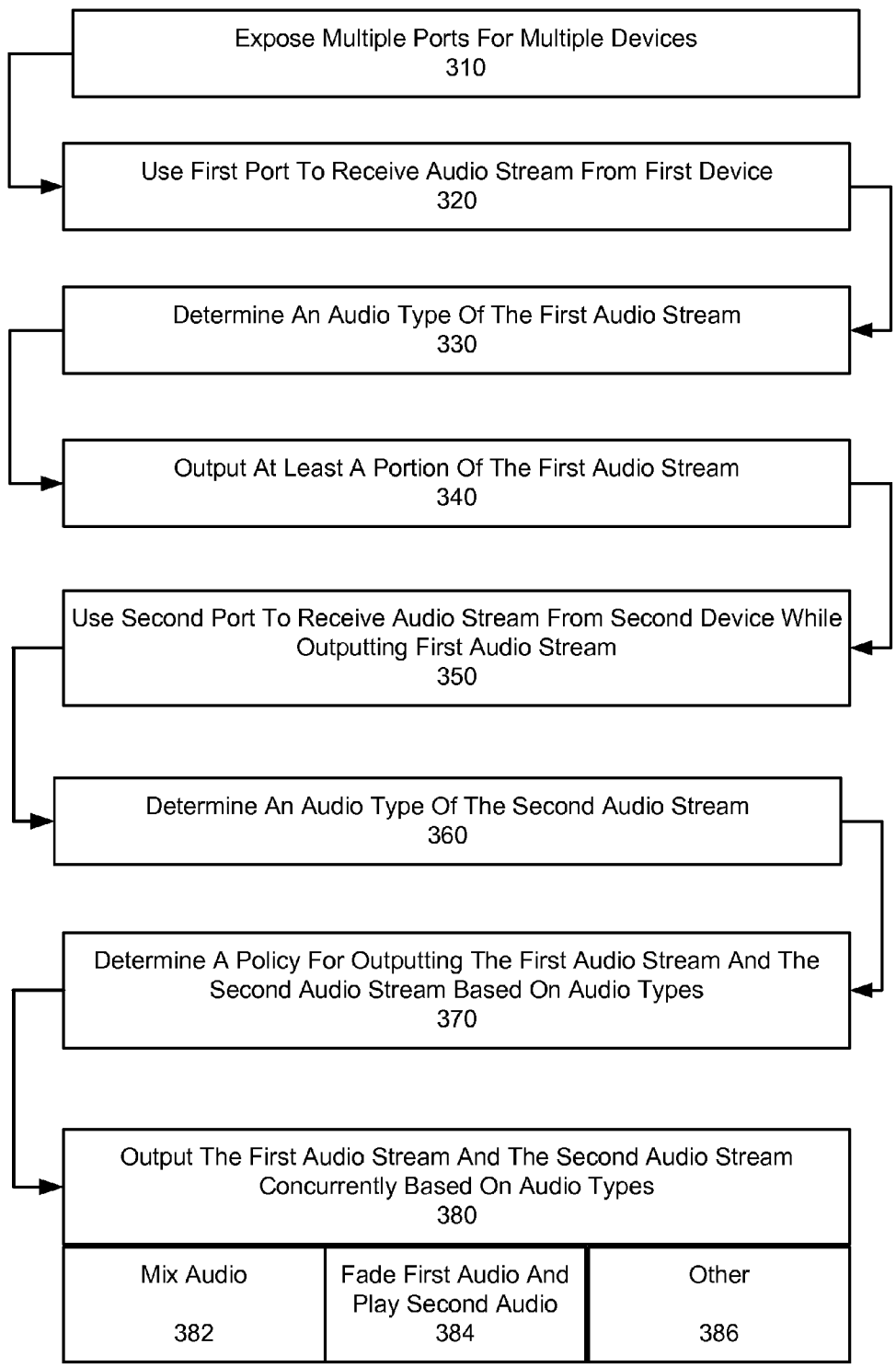
FIG. 3 illustrates a method for operating an audio output device to output multiple audio streams received from multiple source devices, according to one or more embodiments.
Figure 4:
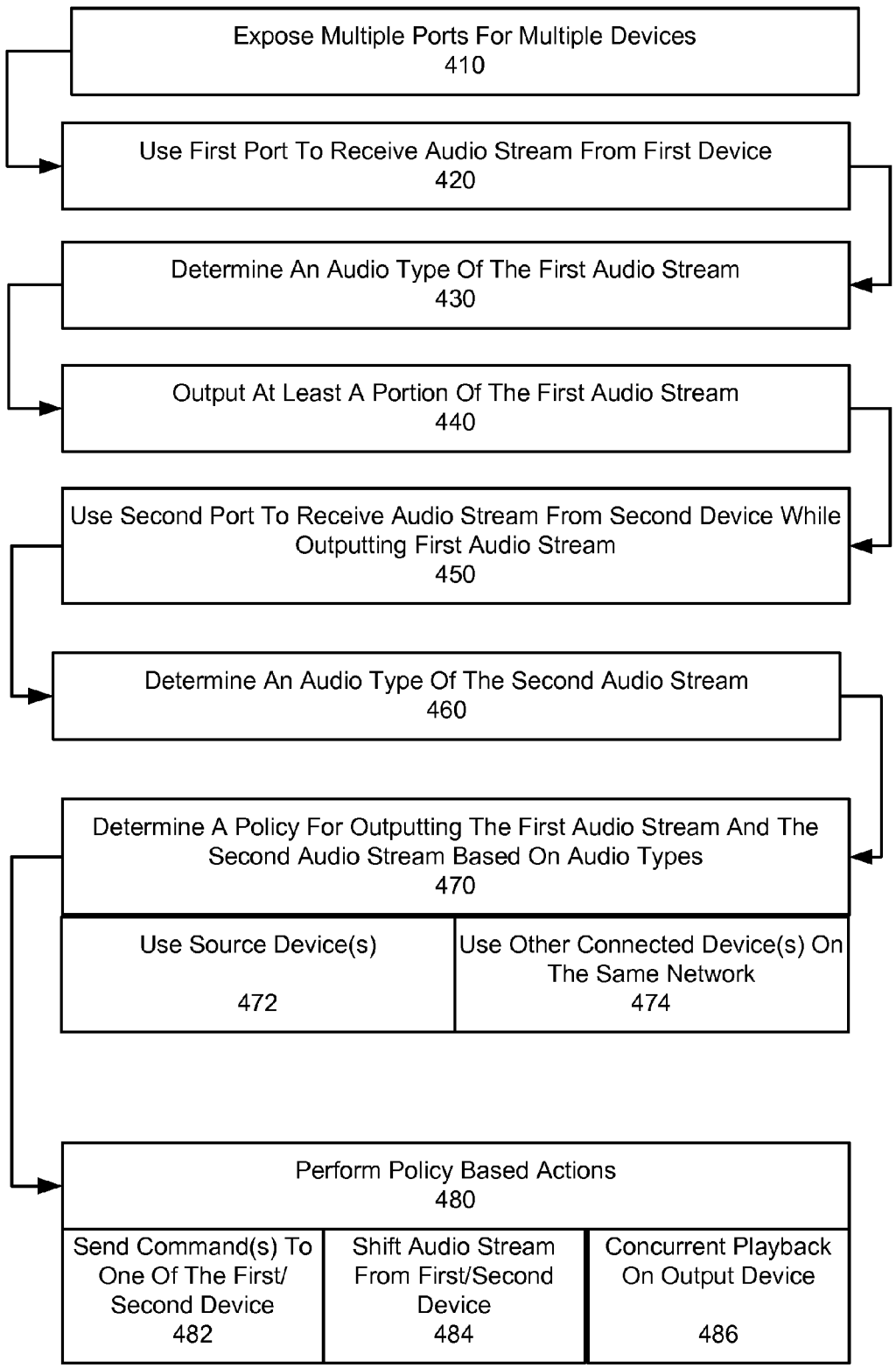
FIG. 4 illustrates a method for implementing policies on the audio output component in a manner that affects one or more of the source devices, according to an embodiment.

FIG. 3 illustrates a method for operating an audio output device to output multiple audio streams received from multiple connected devices, according to one or more embodiments. FIG. 4 illustrates a method for implementing policies on the audio output component in a manner that affects one or more of the source devices. A method such as described with FIG. 3 or FIG. 4 can be implemented using, for example, components such as described with examples of FIG. 1 or FIG. 2. Accordingly, in describing examples of FIG. 3 and FIG. 4, reference may be made to elements of FIG. 1 or FIG. 2 for purpose of illustrating suitable components for performing a step or sub-step being described.

With reference to an example of FIG. 3, an audio output device 110 can expose multiple ports for receiving audio input (310). In one implementation, the audio output device 110 can expose the multiple ports by sending a broadcast advertisement to other locally connected devices. Still further, the advertisement broadcast can be communicated to devices that share a common platform (e.g., have the same software framework and core services) on the local network. Still further, the advertisement broadcast can be communicated to devices that are connected to the audio output device 110 by way of a peer-to-peer connection (e.g., over the local network). In some implementations, the available ports can be static, in that the number of total ports that are in use or that can be used remains the same, regardless of the number of ports that are actually in use. In variations, the ports can be dynamically created, so that ports are created as needed. For example, ports can be created in response to connected devices sending audio streams to the audio output device over the local network. The port interface 210 can, for example, respond to another source device sending the second audio stream by creating the additional port just for a duration during which the second audio stream is being received.

In operation, a first audio stream can be received from a first device over the first port 212 (320). For example, the source device 102 can signal audio stream 101 to this audio output device 110. The audio output device 110 can utilize a peer-to-peer connection made over the local network with the transmitting device.

The audio output device 200 can determine an audio type of the first audio stream (330). In one embodiment, the audio type is determined as being one of music, voice, or an alert. In variations, other kinds of audio types can be defined, such as audio types for sub-categories of music, or audio types for different kinds of alerts. The audio output device 110 can determine the audio type of the first audio stream based on, for example, an identifier of the source device. As an alternative or addition, the audio output device 110 can determine the audio type of the first audio stream based on processing (or sampling) a portion of the incoming stream. For example, the processing resource 122 of the audio input device 110 can use audio recognition samples in order to determine an audio type of the first audio stream.

The audio output device 110 can output at least a portion of the first audio stream (340). While receiving the first stream from the first device, the audio stream from the second device can be received using the second port 214 (350). For example, while the first source device 102 (e.g. tablet) sends the first audio stream (e.g., music file) to the audio output device 110, the second source device 104 (e.g., network connected doorbell) sends a second audio stream 103 corresponding to an alert. Additionally, audio output device 110 can also utilize a peer-to-peer connection in order to receive the second audio stream 103 from the second source device 104.

In response to receiving the second audio stream, the audio output device 110 can determine an audio type of the second audio stream (360). As previously described, the audio type can be determined as being one of music, voice, or an alert. And in variations, other kinds of audio types can be defined, such as audio types for sub-categories of music, or audio types for different kinds of alerts. The audio output device 110 can determine the audio type of the second audio stream based on, for example, an identifier of its source device, or by analyzing or sampling a portion of the incoming stream (e.g., through use of recognition samples).

The audio output component 110 can determine a policy for outputting the two input audio streams as a combined stream based at least in part on the audio type of at least one of the first audio stream or the second audio stream (370). As an addition or alternative, the selection of the policy can also be based on other factors, such as which audio type was received first, time of day, user preferences or settings etc.

In response to receiving multiple audio streams, the audio output component 110 outputs the combined audio stream in a manner that is determined by the selected policy (380). As mentioned with other examples, the selected policy can dictate that the combined audio stream 241 have characteristics that provide for one or more of the following mixing actions: (i) set the volume of one or both of the audio streams, based on the original volume as provided from the source device or relative to the other audio stream; (ii) set an affect (e.g., fade) for one or both of the audio streams based on an audio type; (iii) pause or start (and repeat) one or both streams; and/or (iv) apply the mixing action for a set duration of time (e.g., limit notification to a set number of seconds).

Multiple variations can be provided as to how the different audio streams can be combined. By way of examples, the determined policy can provide for any of the following scenarios: (i) output each audio stream through the output device at a same volume, or alternatively at a same volume that is determined by a setting of the transmitting device (382); (ii) mute or raise the volume of one audio stream relative to another (384); and/or (iii) implement another affect, such as pausing one audio stream for a set duration (386).

While an example of FIG. 3 provides for two audio streams, the use of additional audio streams can be implemented in a similar manner. Thus, for example, when three or more audio streams are received, the individual audio streams can be muted or lowered, raised or subjected to fading or other affects. In some variations, the selected policy can provide for one or more of the multiple audio streams to be paused. Additionally, in some variations, the policy selection can be based on both the audio type and the number of audio streams being concurrently received by the audio output device 110.

With reference to an example of FIG. 4, an audio output device 110 can expose multiple ports for receiving audio input (410). In one implementation, the audio output device 110 can expose the multiple ports by sending a broadcast advertisement to other locally connected devices, as described by prior examples (see FIG. 3). Also as described previously, the available ports can be static or dynamically generated.

In operation, a first audio stream can be received from a first device over the first port 212 (420). For example, the source device 102 can signal audio stream 101 to this audio output device 110. The audio output device 110 can utilize a peer-to-peer connection made over the local network with the transmitting device. The audio output device 200 can determine an audio type of the first audio stream (430). For example, the audio type is determined as being one of music, voice, or an alert.

The audio output device 110 can output at least a portion of the first audio stream (440). While receiving the first stream from the first device, the audio stream from the second device can be received using the second port 214 (450). For example, while the first source device 102 (e.g. tablet) sends the first audio stream (e.g., music file) to the audio output device 110, the second source device 104 (e.g., network connected doorbell) sends a second audio stream 103 corresponding to an alert. Additionally, audio output device 110 can also utilize a peer-to-peer connection in order to receive the second audio stream 103 from the second source device 104.

In response to receiving the second audio stream, the audio output device 110 can determine an audio type of the second audio stream (460). As previously described, the audio type can be determined as being one of music, voice, or an alert.

The audio output component 110 can determine a policy in regards to how output of the two audio streams can handled (470). An example of FIG. 4 provides for the determined policy to be implemented using multiple devices. In one implementation, the determined policy can be implemented using one or more of the source devices 102, 104 (472). For example, the determined policy can provide for altering the manner in which one or both of the source devices operate in connection with the audio output device receiving a particular audio stream, or combination of audio streams.

As an alternative or addition, the determined policy can be implemented using one or more other devices that are connected to the audio output device 110 (474). For example, the determined policy can provide for the audio output device 110 to utilize one or more other devices that are connected to the same local network. Still further, the determined policy can provide for the audio output device 110 to utilize one or more devices that share a platform and/or have an established peer-to-peer connection with the audio output device 110.

In response to receiving multiple audio streams, the audio output component 110 performs the policy based actions in conjunction with the multiple audio streams being outputted (480). The policy based actions can employ, for example, functionality provided by a software platform that is shared with other devices on the same network of the audio output device. In one embodiment, the policy determined from one or both of the audio types may provide for the audio output device to send a command to one or both of the source devices for the respective audio streams (482). In one implementation, the audio output device determines a command using a command interface of the service library 230. As a usage example, the first device 102 (e.g., tablet) may stream music to the audio output device 110, and the second device 104 (e.g., doorbell) may send a notification. In such an example, the policy determination made at the audio output device 110 provides that the audio output device sends a command to pause the first device 102.

Still further, the policy determined from one or both of the audio types provides for the audio output device to utilize additional connected devices, such as those devices that share a peer-to-peer connection with the audio output device on the local network (484). In one example, the utilization can include re-streaming the first audio stream to another audio output device. For example, the re-streamer 232 can implement a process to identify another audio output device to receive re-streaming. The selection of the other audio output device can be based on a policy 253, such as one that is specific to the audio type being received. For example, alerts can automatically be re-streamed to a mobile device which may be carried by the user. As another example, the first device 102 (e.g., tablet) may stream music to the audio output device 110, and the second device 104 (e.g., doorbell) may send a notification. In such an example, the policy determination made at the audio output device 110 provides that the audio output device 110 forwards one of the audio streams to a second output device. For example, the service library 230 of the audio output device may enable re-streaming of a given audio stream to a designated device or location on the network of the audio output device 200. As another usage example, with reference to FIG. 1, the audio output device 110 may, based on the selected policy, forward the second audio stream 103 from the second source device 104 (e.g., doorbell) to the third source device (e.g., handset) 106, resulting in the doorbell notification being output on the handset, while the audio output device 110 continues to output music provided from the tablet.

Still further, the policy determined from one or both of the audio types may provide for the audio output device to implement concurrent playback, as described with an example of FIG. 3 (486).

While an example of FIG. 4 provides for two audio streams, the use of additional audio streams can be implemented in a similar manner. Thus, for example, policy determinations can provide for affecting individual source devices, utilizing other devices, or providing concurrent output of the multiple audio streams when three or more audio streams are received at one time. Additionally, in some variations, the policy selection can be based on both the audio type and the number of audio streams being concurrently received by the audio output device 110. Additionally, each connection formed can be static or dynamic, depending on the capabilities of the audio output device on which an embodiment is implemented. For example, in one variation, each connection where audio input is sent to the audio output device 110 can be implemented through a dynamically created wireless port. Additionally, another wireless port may be created on the audio output device 110 when the audio output device forwards or re-streams the incoming audio data to a second output device. The wireless ports can be created on Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating an audio output device on a network, the method being implemented by one or more processors of the audio output device and comprising:
    receiving a first audio stream, via a first audio port of the audio output device, from a first source device in the network;
    while receiving the first audio stream, broadcasting an advertisement to the network to advertise an availability of additional audio ports on the audio output device; and
    dynamically generating the additional audio ports, on the audio output device, to receive one or more audio streams in response to the advertisement.

2. The method of claim 1, further comprising:
    terminating the first audio port upon termination of the first audio stream.

3. The method of claim 1, wherein the audio output device communicates with the first source device using a wireless peer-to-peer connection.

4. The method of claim 1, wherein the dynamically generating comprises:
    detecting a second audio stream from a second source device in the network; and
    generating a second audio port to receive the second audio stream.

5. The method of claim 1, wherein the dynamically generating comprises:
    establishing a connection with a second source device; and
    generating the second audio port in response to establishing the connection with the second source device.

6. The method of claim 3, wherein the audio output device and the first source device use a common application platform to establish the wireless peer-to-peer connection.

7. The method of claim 1, wherein the dynamically generating comprises:
    detecting multiple additional audio streams from multiple source devices; and
    generating a respective audio port to receive each of the multiple audio streams.

8. The method of claim 1, wherein the dynamically generating comprises:
    receiving a connection request from a device carrying an alert;
    generating a new audio port to receive the alert;
    outputting the alert on the audio output device; and
    terminating the new audio port after outputting the alert.

9. The method of claim 1, wherein the dynamically generating comprises:
    receiving a connection request from a second source device;
    generating a second audio port in response to the connection request;
    receiving a second audio stream from the second source device via the second audio port; and
    re-streaming the second audio stream to a second audio output device.

10. The method of claim 9, further comprising:
    selecting the second audio output device to receive the second audio stream based at least in part on a policy that is specific to an audio type of the second audio stream.

11. The method of claim 9, wherein the re-streaming comprises:
    establishing a wireless peer-to-peer connection with the second audio output device.

12. The method of claim 1, wherein the receiving comprises:
    establishing a peer-to-peer connection with the first source device using a network interface of the audio output device; and
    receiving the first audio stream over the peer-to-peer connection.

13. The method of claim 9, wherein the audio output device re-streams the second audio stream to the second audio output device concurrently while receiving the second audio stream from the second source device.

14. The method of claim 1, wherein the dynamically generating comprises:
  receiving a connection request from a second source device; and
  generating a second audio port in response to the connection request.

15. An audio output device comprising:
  a wireless network interface;
  an audio output component;
  a memory to store a set of instructions;
  a processing resource that executes the set of instructions to:
    receive a first audio stream, via a first audio port of the audio output device, from a first source device in the network;
    while receiving the first audio stream, broadcast an advertisement to the network to advertise an availability of additional audio ports on the audio output device; and
    dynamically generate the additional audio ports, on the audio output device, to receive one or more audio streams in response to the advertisement.

16. The audio output device of claim 15, wherein the processing resource is to:
  terminate the first audio port upon termination of the first audio stream.

17. The audio output device of claim 15, wherein the wireless network interface communicates with the first source device using a wireless peer-to-peer connection.

18. The audio output device of claim 15, wherein the processing resource is to dynamically generate the additional audio ports by:
  detecting a second audio stream from a second source device in the network; and
  generating a second audio port to receive the second audio stream.

19. The audio output device of claim 15, wherein the processing resource is to dynamically generate the additional audio ports by:
  establishing a connection with a second source device; and
  generating the second audio port in response to establish the connection with the second source device.

20. The audio output device of claim 19, wherein the audio output device and the first source device use a common application platform to establish the wireless peer-to-peer connection.

21. The audio output device of claim 15, wherein the processing resource is to dynamically generate the additional audio ports by:
  receiving multiple additional audio streams from multiple source devices; and
  generating a respective audio port to receive each of the multiple audio streams.

22. The audio output device of claim 15, wherein the processing resource is to dynamically generate the additional audio ports by:
  receiving a connection request from a device carrying an alert;
  generating a new audio port to receive the alert;
  outputting the alert via the audio output component; and
  terminating the new audio port after outputting the alert.

23. The audio output device of claim 15, wherein the processing resource is to dynamically generate the additional audio ports by:
  receiving a connection request from a second source device;
  generating a second audio port in response to the connection request;
  receiving a second audio stream from the second source device via the second audio port; and
  re-streaming the second audio stream to a second audio output device.

24. The audio output device of claim 23, wherein the processing resource is to further:
  select the second audio output device to receive the second audio stream based at least in part on a policy that is specific to an audio type of the second audio stream.

25. The audio output device of claim 23, wherein the processing resource is to re-stream the second audio stream by:
  establishing a wireless peer-to-peer connection with the second audio output device.

26. The audio output device of claim 15, wherein the processing resource is to receive the first audio stream by:
  establishing a peer-to-peer connection with the first source device using the network interface; and
  receiving the first audio stream over the peer-to-peer connection.

27. The audio output device of 23, wherein the processing resource re-streams the second audio to the second audio output device concurrently while receiving the second audio stream from the second source device.

28. The audio output device of claim 15, wherein the processing resource is to dynamically generate the additional audio ports by:
  receiving a connection request from a second source device; and
  generating a second audio port in response to the connection request.

29. A non-transitory computer-readable medium that stores instructions which, when executed by a processing resource of an audio output device, cause the audio output device to:
  receive a first audio stream, via a first audio port of the audio output device, from a first source device in the network;
  while receiving the first audio stream, broadcast an advertisement to the network to advertise an availability of additional audio ports on the audio output device; and
  dynamically generate the additional audio ports, on the audio output device, to receive one or more audio streams in response to the advertisement.

30. An audio output system comprising:
  means for receiving a first audio stream, via a first audio port of the audio output system, from a first source device in the network;
  means for broadcasting an advertisement to the network, while receiving the first audio stream, to advertise an availability of additional audio ports on the audio output system; and
  means for dynamically generating the additional audio ports, on the audio output system, to receive one or more audio streams in response to the advertisement.

* * * * *